(12) United States Patent
Kobayashi et al.

(10) Patent No.: US 9,927,607 B2
(45) Date of Patent: Mar. 27, 2018

(54) IMAGING LENS AND IMAGING APPARATUS

(71) Applicant: FUJIFILM Corporation, Tokyo (JP)

(72) Inventors: Hiroaki Kobayashi, Saitama (JP); Takeshi Kamiya, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/375,248

(22) Filed: Dec. 12, 2016

(65) Prior Publication Data

US 2017/0219820 A1  Aug. 3, 2017

(30) Foreign Application Priority Data

Jan. 28, 2016 (JP) .................. 2016-013896

(51) Int. Cl.
| | |
|---|---|
| G02B 13/04 | (2006.01) |
| G02B 9/00 | (2006.01) |
| G02B 27/00 | (2006.01) |
| B60R 1/08 | (2006.01) |
| B60R 1/12 | (2006.01) |
| G02B 9/64 | (2006.01) |
| G02B 13/00 | (2006.01) |
| G02B 13/06 | (2006.01) |
| H04N 5/247 | (2006.01) |
| H04N 7/18 | (2006.01) |

(52) U.S. Cl.
CPC .......... *G02B 27/0025* (2013.01); *B60R 1/081* (2013.01); *B60R 1/12* (2013.01); *G02B 9/64* (2013.01); *G02B 13/0045* (2013.01); *G02B 13/06* (2013.01); *B60R 2001/1253* (2013.01); *H04N 5/247* (2013.01); *H04N 7/181* (2013.01)

(58) Field of Classification Search
CPC ............................ G02B 13/04; G02B 13/0045
USPC ......................... 359/708, 750, 754
See application file for complete search history.

(56) References Cited

U.S. PATENT DOCUMENTS

2012/0147485 A1*  6/2012 Kubota ................ G02B 9/62
359/794

FOREIGN PATENT DOCUMENTS

JP  3491578 B2  1/2004

\* cited by examiner

*Primary Examiner* — William Choi
(74) *Attorney, Agent, or Firm* — Studebaker & Brackett PC

(57) ABSTRACT

Provided are an imaging lens and an Imaging apparatus which includes this imaging lens. The imaging lens consists of, in order from an object side: a front group GF; a diaphragm St; and a rear group GR. The front group GF consists of, in order from the object side: a first lens L1 that is convex toward the object side and has a negative refractive power; a second lens L2 that has a negative refractive power; and a third lens L3 that has a positive refractive power. The rear group GR consists of, in order from the object side: a fourth lens L4 that has a positive refractive power; a fifth lens L5 that has a positive refractive power; a sixth lens L6 that has a negative refractive power; a seventh lens L7 that has a positive refractive power; and an eighth lens L8 that has a negative refractive power.

20 Claims, 7 Drawing Sheets

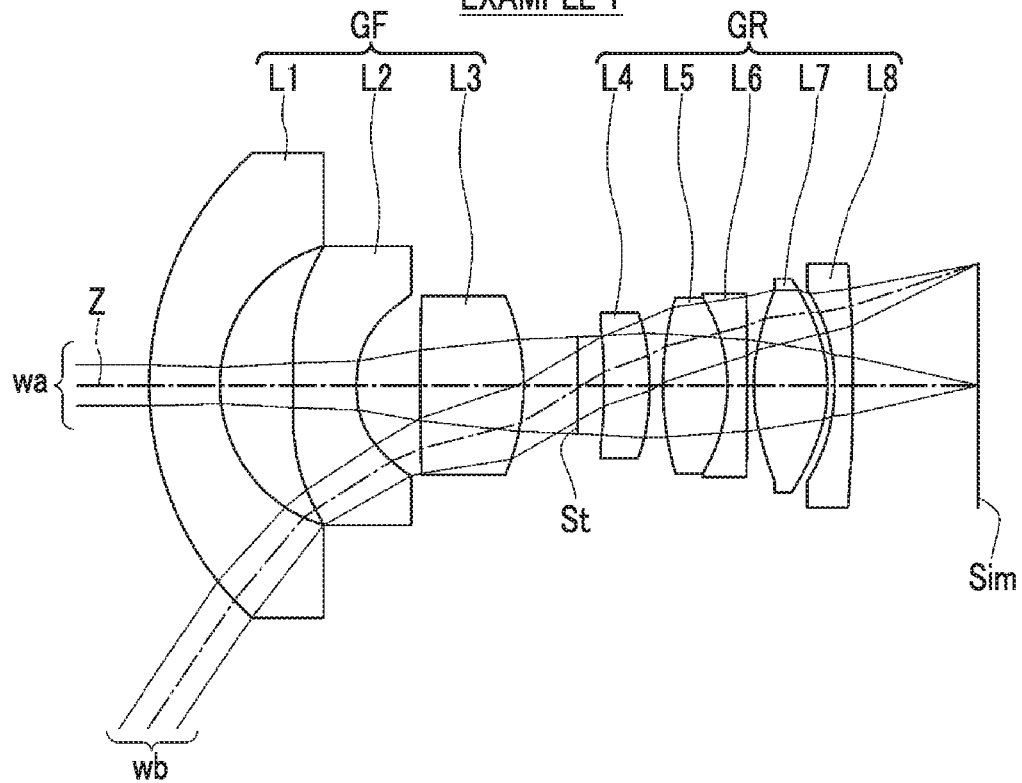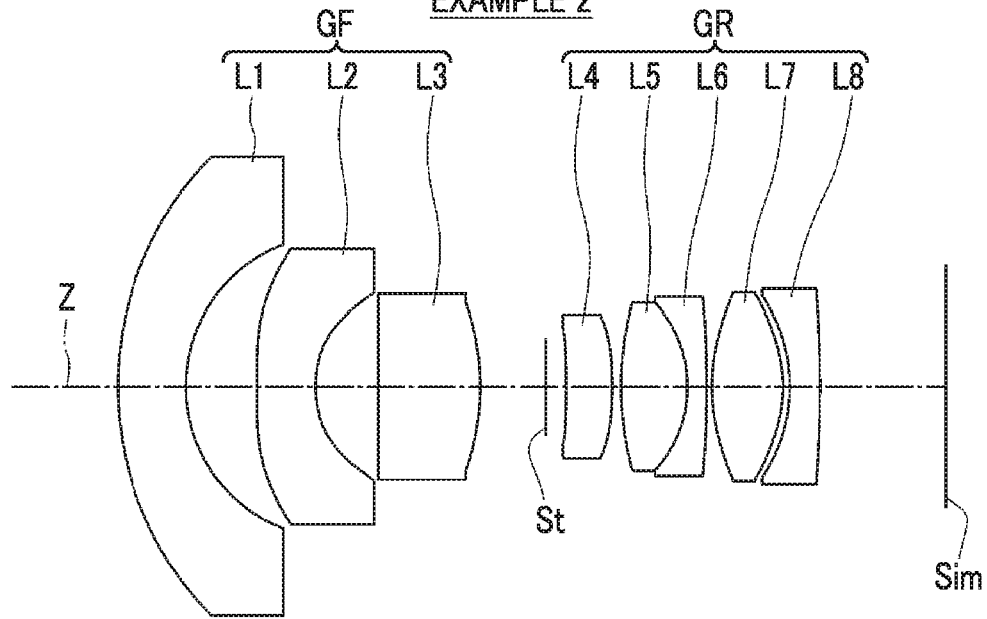

IMAGING LENS AND IMAGING APPARATUS

CROSS-REFERENCE TO RELATED APPLICATIONS

The present application claims priority under 35 U.S.C. § 119 to Japanese Patent Application No. 2016-013896, filed on Jan. 28, 2016. Each of the above applications) is hereby expressly incorporated by reference, in its entirety, into the present application.

BACKGROUND OF THE INVENTION

1. Field of the Invention

The present invention relates to an imaging lens, which is appropriate for an on-board camera, a surveillance camera, or the like, and an imaging apparatus which comprises the imaging lens.

2. Description of the Related Art

JP3491578B describes known imaging lenses used in on-board cameras, surveillance cameras, and the like. JP3491578B discloses imaging lenses each including, in order from the object side, a front group, a diaphragm, and a rear group, which are totally formed of seven lenses.

SUMMARY OF THE INVENTION

In the imaging lenses used in the on-board cameras, surveillance cameras, and the like, it is necessary to capture an image of a wide area, and thus an angle of view satisfying a certain level is required therefor. However, the lenses proposed in JP3491578B have total angles of view in a range of about 67° to 69°, but it is preferable to use lenses having wider angles of view.

Further, F numbers of all the lenses proposed in JP3491578B are in a range of about 2.8 to 3.2, but it is preferable to use lenses having smaller F numbers. Further, it is preferable to use a lens which is more advantageous in terms of various aberrations.

The present invention has been made in consideration of the above-mentioned situation, and its object is to provide an imaging lens, which is a wide-angle imaging lens, has a small F number, and is capable of satisfactorily correcting various aberrations, and an imaging apparatus which comprises this imaging lens.

An imaging lens of the present invention consists of, in order from an object side: a front group; a diaphragm; and a rear group. The front group consists of, in order from the object side, a first lens that is convex toward the object side and has a negative refractive power, a second lens that has a negative refractive power, and a third lens that has a positive refractive power. The rear group consists of, in order from the object side, a fourth lens that has a positive refractive power, a fifth lens that has a positive refractive power, a sixth lens that has a negative refractive power, a seventh lens that has a positive refractive power, and an eighth lens that has a negative refractive power.

It is preferable that the imaging lens of the present invention satisfies the following conditional expression (1), and it is more preferable that the imaging lens satisfies the following conditional expression (1-1).

$$-0.4 < f/fF < -0.1 \tag{1}$$

$$-0.27 < f/fF < -0.14 \tag{1-1}$$

Here, f is a focal length of a whole system, and fF is a focal length of the front group.

It is preferable that the imaging lens satisfies the following conditional expression (2), and it is more preferable that the imaging lens satisfies the following conditional expression (2-1).

$$0.36 < f/fR < 0.57 \tag{2}$$

$$0.41 < f/fR < 0.52 \tag{2-1}$$

Here, f is a focal length of a whole system, and fR is a focal length of the rear group.

It is preferable that the imaging lens satisfies the following conditional expression (3), and it is more preferable that the imaging lens satisfies the following conditional expression (3-1).

$$0.65 < D34/f < 1.5 \tag{3}$$

$$0.79 < D34/f < 1.17 \tag{3-1}$$

Here, D34 is an air gap on an optical axis between the third lens and the fourth lens, and f is the focal length of the whole system.

It is preferable that the imaging lens satisfies the following conditional expression (4), and it is more preferable that the imaging lens satisfies the following conditional expression (4-1).

$$100 < 2\omega \tag{4}$$

$$110 < 2\omega \tag{4-1}$$

Here, 2ω is a total angle of view (°).

An imaging apparatus of the present invention comprises the above-mentioned imaging lens of the present invention.

It should be noted that a term "includes, substantially ~" means that the imaging lens may include not only the above-mentioned elements but also lenses substantially having no powers, optical elements, which are not lenses, such as a diaphragm, a mask, a cover glass, and a filter, and mechanism parts such as a lens flange, a lens barrel, an imaging element, and/or a hand shaking correction mechanism.

Further, reference signs of surface shapes, radii of curvature, and/or refractive powers of the lenses are assumed as those in paraxial regions in a case where some lenses have aspheric surfaces.

The imaging lens of the present invention consists of, in order from the object side: the front group; the diaphragm; and the rear group. The front group consists of, in order from the object side, the first lens that is convex toward the object side and has a negative refractive power, the second lens that has a negative refractive power, and the third lens that has a positive refractive power. The rear group consists of, in order from the object side, the fourth lens that has a positive refractive power, the fifth lens that has a positive refractive power, the sixth lens that has a negative refractive power, the seventh lens that has a positive refractive power, and the eighth lens that has a negative refractive power. Therefore, it is possible to obtain an imaging lens which is a wide-angle imaging lens, has a small F number, and is capable of satisfactorily correcting various aberrations.

Further, the imaging apparatus of the present invention comprises the imaging lens of the present invention. Thus, it is possible to appropriately capture a bright and high-quality image with a wide angle of view.

BRIEF DESCRIPTION OF THE DRAWINGS

FIG. 2 is a ray diagram of the imaging lens (common to Example 1).

FIG. 3 is a cross-sectional view illustrating a lens configuration of an imaging lens of Example 2 of the present invention.

DESCRIPTION OF THE PREFERRED EMBODIMENTS

Figure 1:
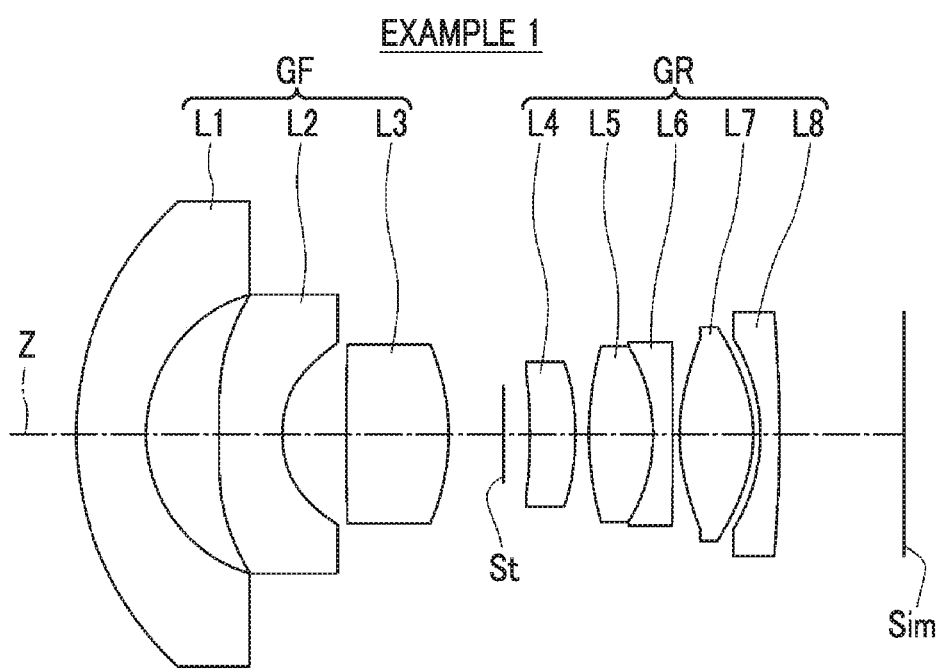
FIG. 1 is a cross-sectional view illustrating a lens configuration of an imaging lens (common to Example 1) according to an embodiment of the present invention.

Hereinafter, embodiments of the present invention will be described with reference to drawings. FIG. 1 is a cross-sectional view illustrating a lens configuration of an imaging lens according to an embodiment of the present invention. FIG. 2 is a ray diagram of the imaging lens. The exemplary configuration shown in FIGS. 1 and 2 is the same as a configuration of an imaging lens of Example 1 to be described later. In FIGS. 1 and 2, a left side thereof is an object side, and a right side thereof is an image side. In addition, an aperture diaphragm St shown in the drawing does not necessarily indicate its sizes and/or shapes, but indicates a position of the diaphragm on the optical axis Z. FIG. 2 shows on-axis rays wa and rays with maximum angle of view wb.

As shown in FIG. 1, the imaging lens includes, in order from an object side: a front group GF; a diaphragm St; and a rear group GR.

The front group GF includes, in order from an object side: a first lens L1 that is convex toward the object side and has a negative refractive power; a second lens L2 that has a negative refractive power; and a third lens L3 that has a positive refractive power.

As described above, an object side surface of the first lens L1 is formed as a convex surface, and thereby it becomes easy to correct distortion of peripheral portion even in a wide-angle lens, both of the first lens L1 and the second lens L2, which are two lenses disposed in order from the object side, are formed as negative lenses, and thereby it becomes easy to increase an angle of view of the whole lens system. Further, the subsequent third lens L3 is formed as a positive lens, and is formed as a retrofocus lens which includes, in order from the object side, a negative lens, a negative lens, and a positive lens, and thereby, this configuration is advantageous in an increase in angle of view.

The rear group GR includes, in order from the object side: a fourth lens L4 that has a positive refractive power; a fifth lens L5 that has a positive refractive power; a sixth lens L6 that has a negative refractive power; a seventh lens L7 that has a positive refractive power; and an eighth lens L8 that has a negative refractive power.

As described above, a convergence effect and aberration correction necessary for the rear group GR are shared by three positive lenses, that is, the fourth lens L4, the fifth lens L5, and the seventh lens L7, and thereby it is possible to effectively correct various aberrations. Further, two positive lenses, that is, the fourth lens L4 and the fifth lens L5 are consecutively arranged in order from an image side of the aperture diaphragm St. Thereby, it is possible to gently deflect on-axis marginal rays, and thus it is possible to prevent high-order spherical aberration from occurring. Thereby, it is possible to form a lens having a small F number. Furthermore, the sixth lens L6, which has a negative refractive power, is disposed at a position relatively close to the aperture diaphragm St, and thereby this configuration is advantageous in correction of lateral chromatic aberration. In addition, the eighth lens L8 has a function of correcting spherical aberration which occurs between the fourth lens L4 and the seventh lens L7.

It is preferable that the imaging lens of the present embodiment satisfies the following conditional expression (1). By not allowing the result of the conditional expression (1) to be equal to or less than the lower limit, it is possible to decrease a total length of the lens. By not allowing the result of the conditional expression (1) to be equal to or greater than the upper limit, it becomes advantageous to increase an angle of view thereof in addition, if the following conditional expression (1-1) is satisfied, it is possible to obtain more favorable characteristics.

$$-0.4 < f/fF < -0.1 \tag{1}$$

$$-0.27 < f/fF < -0.14 \tag{1-1}$$

Here, f is a focal length of a whole system, and
fF is a focal length of the front group.

It is preferable that the imaging lens satisfies the following conditional expression (2). By not allowing the result of the conditional expression (2) to be equal to or less than the lower limit, it becomes advantageous to increase an angle of view thereof. By not allowing the result of the conditional expression (2) to be equal to or greater than the upper limit, it becomes advantageous to satisfactorily correct spherical aberration. In addition, if the following conditional expression (2-1) is satisfied, it is possible to obtain more favorable characteristics.

$$0.36 < f/fR < 0.57 \tag{2}$$

$$0.41 < f/fR < 0.52 \tag{2-1}$$

Here, f is a focal length of a whole system, and
fR is a focal length of the rear group.

It is preferable that the imaging lens satisfies the following conditional expression (3). By not allowing the result of the conditional expression (3) to be equal to or less than the lower limit, it becomes easy to separate rays into on-axis rays and off-axis rays. Thus, it becomes easy to correct aberrations. By not allowing the result of the conditional expression (3) to be equal to or greater than the upper limit, it becomes easy to decrease a size of the whole lens. In addition, if the following conditional expression (3-1) is satisfied, it is possible to obtain more favorable characteristics.

$$0.65 < D34/f < 1.5 \tag{3}$$

$$0.79 < D34/f < 1.17 \tag{3-1}$$

Here, D34 is an air gap on an optical axis between the third lens and the fourth lens, and f is a focal length of a whole system.

It is preferable that the imaging lens satisfies the following conditional expression (4). By satisfying the conditional expression (4), it is possible to achieve an increase in angle of view, and it is possible to capture an image in a range of a wide angle of view. Hence, in particular, in a case where the imaging lens of the present embodiment is applied to an on-board camera, it is possible to capture an image of a vehicle or a person in front of the own vehicle or approaching laterally at a crossing or the like, through a single camera. Further, in a case where the imaging lens is applied to a surveillance camera, thereby an angle of view thereof is greater than 90°. Thus, it is possible to get rid of blind area by providing the camera at each of four corners of a ceiling of the room. In addition, if the following conditional expression (4-1) is satisfied, it is possible to obtain more favorable characteristics.

$$100 < 2\omega \quad (4)$$

$$110 < 2\omega \quad (4\text{-}1)$$

Here, $2\omega$ is a total angle of view (°).

In a case of using the imaging lens under severe environment, it is preferable to perform protective multilayer film coating. Not only the protective coating but also anti-reflective coating for reducing ghost light in use may be performed.

If the imaging lens is intended to be applied to imaging apparatus, a cover glass, a prism, and/or various filters such as an infrared cut filter and a lowpass filter may be disposed between the lens system and an image plane Sim in accordance with a configuration of a camera on which the lens is mounted. In addition, instead of positioning such various filters between the lens system and the image plane Sim, such various filters may be disposed between lenses, and coating for applying the same effects as the various filters may be performed on a lens surface of any one lens thereof.

Next, numerical examples of the imaging lens of the present invention will be described.

Figure 4:
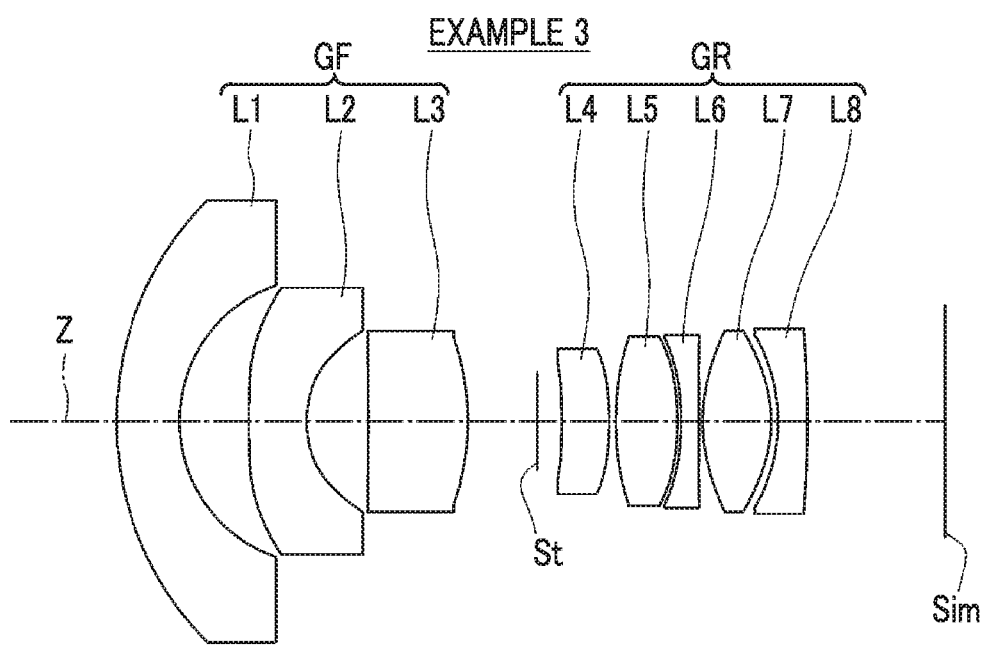
FIG. 4 is a cross-sectional view illustrating a lens configuration of an imaging lens of Example 3 of the present invention.

First, the imaging lens of Example 1 will be described. FIG. 1 is a cross-sectional view illustrating a lens configuration of the imaging lens of Example 1. In FIG. 1 and FIGS. 3 and 4 corresponding to Examples 2 and 3 to be described later, left sides thereof are the object side, and right sides thereof are the image side. In addition, the aperture diaphragm St shown in the drawings does not necessarily indicate its sizes and/or shapes, and indicates a position of the diaphragm on the optical axis Z.

Table 1 shows basic lens data of the imaging lens of Example 1, Table 2 shows data about specification, and Table 3 shows data about aspheric coefficients. Hereinafter, meanings of the reference signs in the tables are, for example, as described in Example 1, and are basically the same as those in Examples 2 and 3.

In the lens data of Table 1, the column of the surface number shows surface numbers. The surface of the elements closest to the object side is the first surface, and the surface numbers sequentially increase toward the image side. The column of the radius of curvature shows radii of curvature of the respective surfaces. The column of the surface distance shows distances on the optical axis Z between the respective surfaces and the subsequent surfaces. The column of n shows refractive indexes of the respective optical elements at the d-line (a wavelength of 587.6 nm, where nm represents nanometer). The column of v shows Abbe numbers of the respective optical elements at the d-line (a wavelength of 587.6 nm).

Here, the sign of the radius of curvature is positive in a case where a surface has a shape convex toward the object side, and is negative in a case where a surface has a shape convex toward the image side. The basic lens data also includes and indicates the aperture diaphragm St. In a place of a surface number of a surface corresponding to the aperture diaphragm St, the surface number and a term of (diaphragm) are noted.

The data about specification of Table 2 shows values of a focal length f of the whole system, a back focal length Bf', an F number FNo., and a total angle of view $2\omega$.

In the basic lens data and the data about specification, degree ([°]) is used as a unit of an angle, and millimeter (mm) as a unit of a length, but appropriate different units may be used since the optical system can be used even in a case where the system is enlarged or reduced in proportion.

In the lens data of Table 1, the reference sign * is attached to surface numbers of aspheric surfaces, and radii of curvature f the aspheric surfaces are represented by numerical values of paraxial radii of curvature. The data about aspheric coefficients of Table 3 shows the surface numbers of the aspheric surfaces and aspheric coefficients of the aspheric surfaces. The "E±n" (n: an integer) in numerical values of the aspheric coefficients of Table 3 indicates "×10$^{\pm n}$". The aspheric coefficients are values of the coefficients KA and Am (m=3, . . . , 20) in aspheric surface expression represented as the following expression.

$$Zd = C \cdot h^2 / \{1 + (1 - KA \cdot C^2 \cdot h^2)^{1/2}\} + \Sigma Am \cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of a paraxial radius of curvature, and KA and Am are aspheric coefficients (m=3, . . . , 20).

TABLE 1

Example 1 Lens Data (n and v are at d-line)

| Surface number | Radius of curvature | Surface distance | n | v |
|---|---|---|---|---|
| 1 | 8.2314 | 1.8637 | 1.91082 | 35.25 |
| 2 | 3.8194 | 1.9338 | | |
| *3 | −60.9293 | 1.6693 | 1.53112 | 55.30 |
| *4 | 3.2564 | 1.6898 | | |
| 5 | 71.6839 | 2.7142 | 1.59551 | 39.26 |
| 6 | −5.7880 | 1.4250 | | |
| 7 (Diaphragm) | ∞ | 0.6929 | | |
| *8 | −19.5999 | 1.2026 | 1.53112 | 55.30 |
| *9 | −8.4649 | 0.3636 | | |
| 10 | 8.3654 | 1.6999 | 1.60300 | 65.44 |
| 11 | −4.3700 | 0.5179 | 1.62004 | 36.30 |
| 12 | −156.8066 | 0.1780 | | |
| *13 | 4.8984 | 1.9486 | 1.53112 | 55.30 |
| *14 | −3.5831 | 0.1917 | | |
| 15 | −4.6943 | 0.5000 | 1.94595 | 17.98 |
| 16 | −37.3786 | 3.3164 | | |

TABLE 2

Example 1 Specification

| | |
|---|---|
| f | 2.43 |
| Bf' | 3.32 |
| FNo. | 2.30 |
| 2ω[°] | 112.0 |

TABLE 3

Example 1 Aspheric Coefficients

| Surface number | 3 | 4 | 8 | 9 |
|---|---|---|---|---|
| KA  | −2.8176363E+03 | 9.9294246E−01 | −4.2830595E+02 | 1.2012454E+01 |
| A3  | 7.7513164E−18 | −1.4649663E−17 | −2.4122447E−17 | 9.9116203E−19 |
| A4  | 1.5952739E−02 | 2.9370460E−02 | −9.6017571E−03 | −4.5331190E−03 |
| A5  | −2.0028470E−03 | −9.5792561E−03 | 7.7744727E−04 | 1.1664655E−03 |
| A6  | −1.1327285E−03 | 4.8730996E−03 | 8.7364331E−04 | −6.8707280E−04 |
| A7  | −1.2200217E−04 | −1.1064831E−04 | −4.1880749E−04 | −1.7788826E−04 |
| A8  | 2.3648484E−04 | −2.3421883E−03 | 3.7054680E−04 | 3.2904052E−04 |
| A9  | 1.8647262E−05 | −1.7284915E−04 | −1.2660916E−04 | 7.7666078E−06 |
| A10 | −3.4522295E−05 | 9.6145523E−04 | −1.0828421E−04 | −3.8755097E−05 |
| A11 | −1.5920973E−06 | 6.9030790E−05 | 1.6626276E−05 | −1.5355398E−06 |
| A12 | 3.7327513E−06 | −2.2596681E−04 | 1.3956582E−05 | 2.7897058E−06 |
| A13 | 1.1237555E−07 | −1.1181268E−05 | −1.0116301E−06 | 1.6384513E−07 |
| A14 | −2.9020024E−07 | 2.8463882E−05 | −1.0053561E−06 | −1.2992408E−07 |
| A15 | −4.7808421E−09 | 1.0629375E−06 | 3.4479138E−08 | −8.1749629E−09 |
| A16 | 1.4243196E−08 | −1.9320081E−06 | 4.1347297E−08 | 3.6562143E−09 |
| A17 | 1.1316055E−10 | −5.4639262E−08 | −6.2534748E−10 | 2.0395591E−10 |
| A18 | −3.8760369E−10 | 6.4474653E−08 | −9.0902317E−10 | −5.6363104E−11 |
| A19 | −1.1474337E−12 | 1.1705317E−09 | 4.7212070E−12 | −2.0579861E−12 |
| A20 | 4.4276129E−12 | −7.6025529E−10 | 8.2956979E−12 | 3.5922342E−13 |

| Surface number | 13 | 14 |
|---|---|---|
| KA  | 6.3616994E−01 | 9.6228014E−01 |
| A3  | 9.2720122E−19 | −7.5132592E−19 |
| A4  | −2.6687244E−03 | 9.6804577E−03 |
| A5  | −1.7473567E−03 | 1.4739138E−03 |
| A6  | 7.0807967E−04 | −5.9246451E−03 |
| A7  | 6.7913701E−04 | 3.3455136E−04 |
| A8  | −1.4972528E−04 | 3.4673857E−03 |
| A9  | −2.8421741E−04 | −1.1806339E−05 |
| A10 | −1.5357255E−05 | −1.5623182E−03 |
| A11 | 7.2808664E−05 | −3.8373824E−06 |
| A12 | 1.8617467E−05 | 4.2647150E−04 |
| A13 | −1.1333010E−05 | 3.7792017E−07 |
| A14 | −4.4839167E−06 | −7.0097173E−05 |
| A15 | 1.0687830E−06 | −2.8993305E−08 |
| A16 | 5.0779943E−07 | 6.8392332E−06 |
| A17 | −5.5850762E−08 | 1.6894167E−09 |
| A18 | −2.8281695E−08 | −3.6481685E−07 |
| A19 | 1.2409992E−09 | −4.9049495E−11 |
| A20 | 6.2322479E−10 | 8.2015205E−09 |

Figure 5:
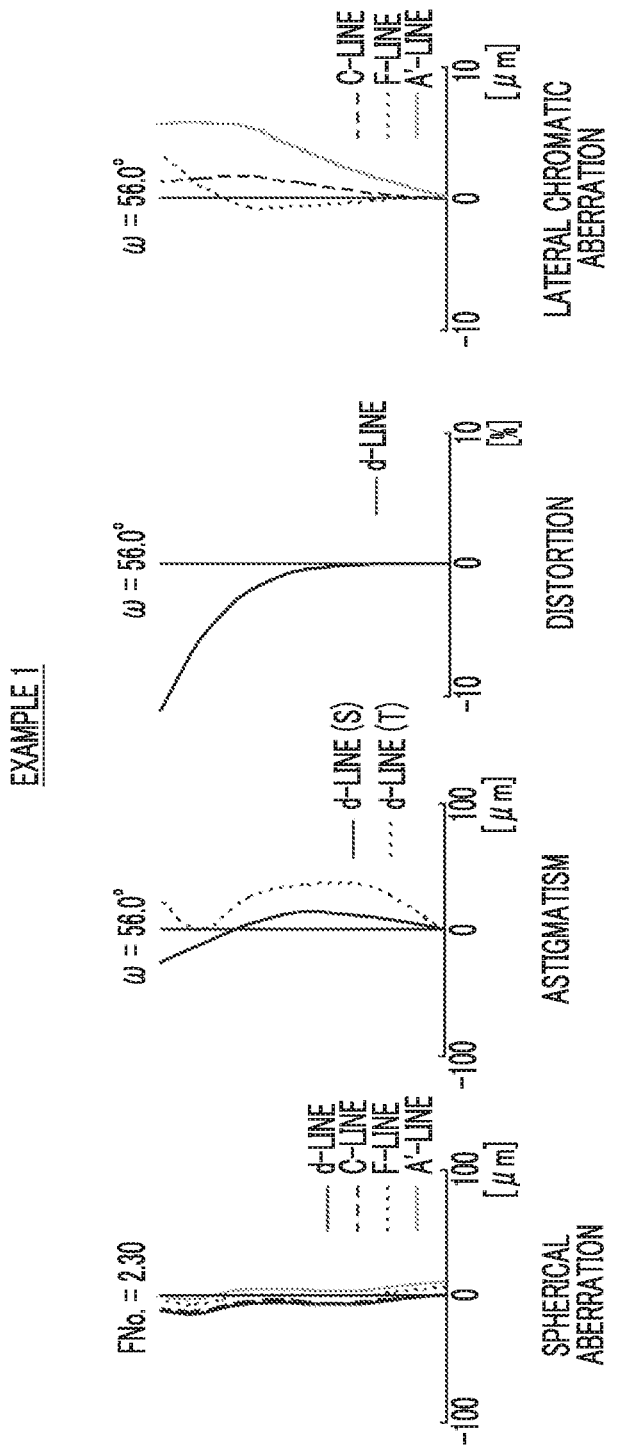
FIG. 5 is a diagram of aberrations of the imaging lens of Example 1 of the present invention.

FIG. 5 shows aberration diagrams of the imaging lens of Example 1. In addition, in order from the left side of FIG. 5, spherical aberration, astigmatism, distortion, and lateral chromatic aberration are shown. Such aberration diagrams show aberrations in a state where the object distance is set as an infinite distance. The aberration diagrams illustrating spherical aberration, astigmatism, and distortion indicates aberrations that occur when the d-line (a wavelength of 587.6 nm) is set as a reference wavelength. In the spherical aberration diagram, aberrations at the d-line (a wavelength of 587.6 nm), the C-line (a wavelength of 656.3 nm), the F-line (a wavelength of 486.1 nm), and the A'-line (a wavelength of 768.2 nm) are respectively indicated by the solid line, the long dashed line, the short dashed line, and the gray solid line. In the astigmatism diagram, aberrations in sagittal and tangential directions are respectively indicated by the solid line and the short dashed line. In the lateral chromatic aberration diagram, aberrations at the C-line (a wavelength of 656.3 nm), the F-line (a wavelength of 486.1 nm), and the A'-line (a wavelength of 768.2 nm) are respectively indicated by the long dashed line, the short dashed line, and the gray solid line. In the spherical aberration diagram, FNo. indicates an F number. In the other aberration diagrams, ω indicates a half angle of view.

In the description of Example 1, reference signs, meanings, and description methods of the respective data pieces are the same as those in the following examples unless otherwise noted. Therefore, in the following description, repeated description will be omitted.

Figure 6:
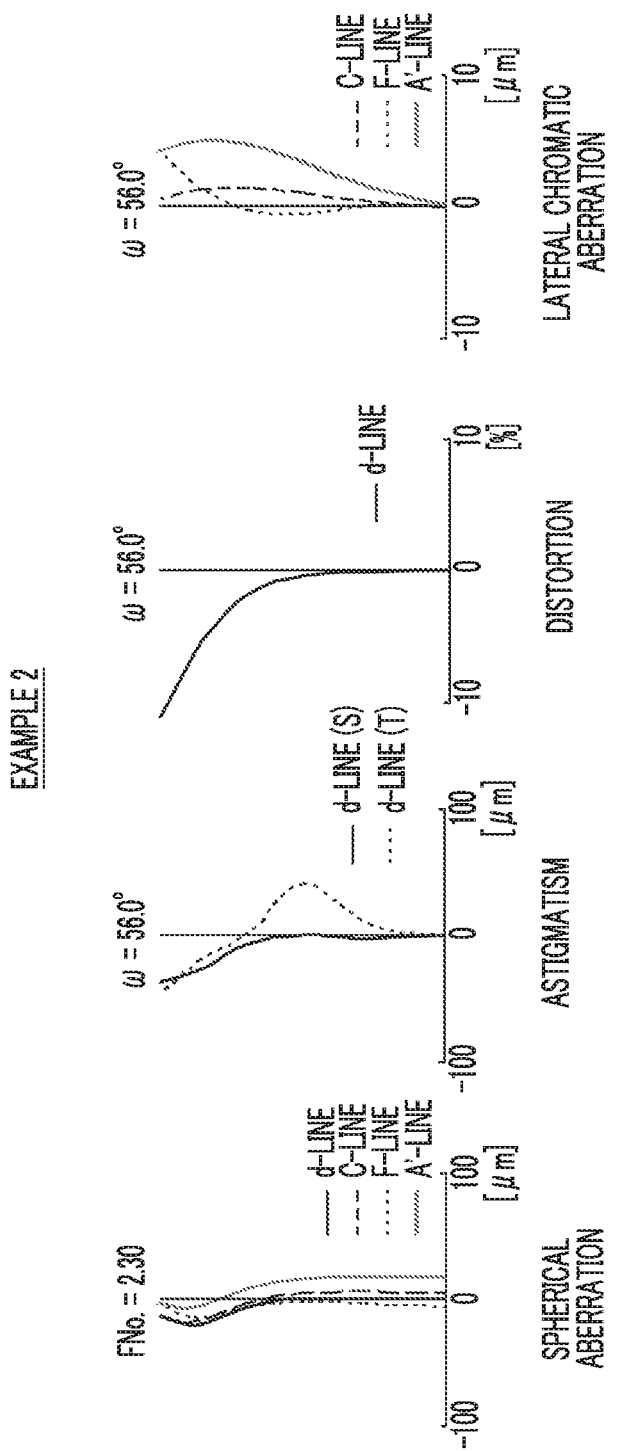
FIG. 6 is a diagram of aberrations of the imaging lens of Example 2 of the present invention.

Next, an imaging lens of Example 2 will be described. FIG. 3 is a cross-sectional view illustrating a lens configuration of the imaging lens of Example 2. Further, Table 4 shows basic lens data of the imaging lens of Example 2, Table 5 shows data about specification, and Table 6 shows data about aspheric coefficients. FIG. 6 shows aberration diagrams thereof.

TABLE 4

Example 2 Lens Data (n and ν are at d-line)

| Surface number | Radius of curvature | Surface distance | n | ν |
|---|---|---|---|---|
| 1  | 8.6576 | 1.8313 | 1.95375 | 32.32 |
| 2  | 4.0233 | 1.9015 | | |
| *3 | −1765.9132 | 1.5699 | 1.53112 | 55.30 |
| *4 | 3.2882 | 1.6848 | | |
| *5 | −160.5424 | 2.7174 | 1.63360 | 23.61 |
| *6 | −6.3457 | 1.7395 | | |

TABLE 4-continued

Example 2 Lens Data (n and ν are at d-line)

| Surface number | Radius of curvature | Surface distance | n | ν |
|---|---|---|---|---|
| 7 (Diaphragm) | ∞ | 0.5433 | | |
| *8 | −19.9943 | 1.2319 | 1.53112 | 55.30 |
| *9 | −8.4595 | 0.2324 | | |
| 10 | 8.5291 | 1.7719 | 1.61800 | 63.33 |
| 11 | −3.2798 | 0.5146 | 1.69895 | 30.05 |
| 12 | −27.5993 | 0.1377 | | |
| *13 | 4.8813 | 1.9017 | 1.53112 | 55.30 |
| *14 | −3.5705 | 0.1815 | | |
| 15 | −4.2989 | 0.8090 | 1.85478 | 24.80 |
| 16 | −31.9447 | 3.3881 | | |

TABLE 5

Example 2 Specification

| f | 2.42 |
|---|---|
| Bf | 3.39 |
| FNo. | 2.30 |
| 2ω[°] | 112.0 |

TABLE 6

Example 2 Aspheric Coefficients

| Surface number | 3 | 4 | 5 | 6 |
|---|---|---|---|---|
| KA | 1.7993402E+05 | 1.0061916E+00 | −2.7258610E+04 | 9.0489800E−01 |
| A3 | −1.0577151E−17 | 1.1052485E−17 | −2.3913029E−19 | 2.8887078E−19 |
| A4 | 1.6123320E−02 | 2.4450859E−02 | −9.0073904E−04 | 7.6785719E−04 |
| A5 | −1.8652437E−03 | −9.3934206E−03 | 2.6305782E−04 | 3.4686428E−04 |
| A6 | −1.0440318E−03 | 7.2025845E−03 | 8.2984596E−04 | −7.2769231E−04 |
| A7 | −1.5408657E−04 | 3.0775012E−07 | −1.6546576E−04 | 2.7047928E−05 |
| A8 | 2.1560955E−04 | −2.9878652E−03 | −5.1415117E−04 | 5.8189151E−04 |
| A9 | 2.3301527E−05 | −1.5600473E−04 | 6.9471799E−05 | −5.6175957E−05 |
| A10 | −3.2513222E−05 | 9.0529904E−04 | 1.9728436E−04 | −2.7912005E−04 |
| A11 | −2.0456080E−06 | 5.5198627E−05 | −1.7101941E−05 | 2.2227864E−05 |
| A12 | 3.6229728E−06 | −1.6934585E−04 | −4.6469995E−05 | 8.1774253E−05 |
| A13 | 1.4215551E−07 | −8.1787896E−06 | 2.5490684E−06 | −4.6826616E−06 |
| A14 | −2.8690334E−07 | 1.7794041E−05 | 6.7338484E−06 | −1.4764579E−05 |
| A15 | −5.9903014E−09 | 7.1783081E−07 | −2.2622734E−07 | 5.5108847E−07 |
| A16 | 1.4278691E−08 | −1.0089770E−06 | −5.8497409E−07 | 1.5986055E−06 |
| A17 | 1.4024776E−10 | −3.4310051E−08 | 1.0989547E−08 | −3.4053141E−08 |
| A18 | −3.9468466E−10 | 2.6629668E−08 | 2.7934098E−08 | −9.5057196E−08 |
| A19 | −1.4005931E−12 | 6.8763458E−10 | −2.2480211E−10 | 8.6106468E−10 |
| A20 | 4.5926449E−12 | −1.8639125E−10 | −5.6364840E−10 | 2.3854158E−09 |

| Surface number | 8 | 9 | 13 | 14 |
|---|---|---|---|---|
| KA | −4.9397610E+02 | 1.4312509E+01 | 6.3833406E−01 | 9.5808286E−01 |
| A3 | 9.0780078E−17 | −4.6121720E−19 | 1.2927299E−19 | −8.3966742E−19 |
| A4 | −1.1267471E−02 | −4.2826165E−03 | −3.6786351E−03 | 6.1338861E−03 |
| A5 | 2.6967097E−03 | −7.9833785E−04 | −9.8263601E−04 | 2.8253235E−03 |
| A6 | 2.8464292E−05 | 6.1607367E−04 | 1.6772850E−03 | −1.5417901E−04 |
| A7 | −1.0225101E−03 | −1.1627196E−04 | 3.3749287E−04 | −5.5266857E−04 |
| A8 | 1.1198734E−03 | −2.4320079E−05 | −6.8159287E−04 | 4.0458083E−04 |
| A9 | −2.4153236E−04 | −7.0448035E−06 | −1.6296470E−04 | 3.5583667E−04 |
| A10 | −3.2600895E−04 | 1.6797502E−05 | 1.7544247E−04 | −2.6282041E−04 |
| A11 | 4.0804468E−05 | 7.7381992E−07 | 4.4605300E−05 | −9.8887466E−05 |
| A12 | 4.7841442E−05 | −2.5271349E−06 | −2.3740648E−05 | 8.7523463E−05 |
| A13 | −3.1166800E−06 | −2.7750586E−08 | −7.1646069E−06 | 1.5627706E−05 |
| A14 | −4.0587999E−06 | 1.8579470E−07 | 1.0699784E−06 | −1.5729532E−05 |
| A15 | 1.3337393E−07 | 6.0379179E−10 | 6.9377667E−07 | −1.5065929E−06 |
| A16 | 1.9937761E−07 | −7.7489449E−09 | 1.0663660E−07 | 1.6167794E−06 |
| A17 | −3.0391910E−09 | −6.5203569E−12 | −3.7160142E−08 | 8.0863348E−08 |
| A18 | −5.2700662E−09 | 1.7326258E−10 | −1.4793756E−08 | −8.9153167E−08 |
| A19 | 2.8980186E−11 | 1.1887919E−14 | 8.4584137E−10 | −1.8504422E−09 |
| A20 | 5.8018397E−11 | −1.6178088E−12 | 5.0633695E−10 | 2.0498111E−09 |

Figure 7:
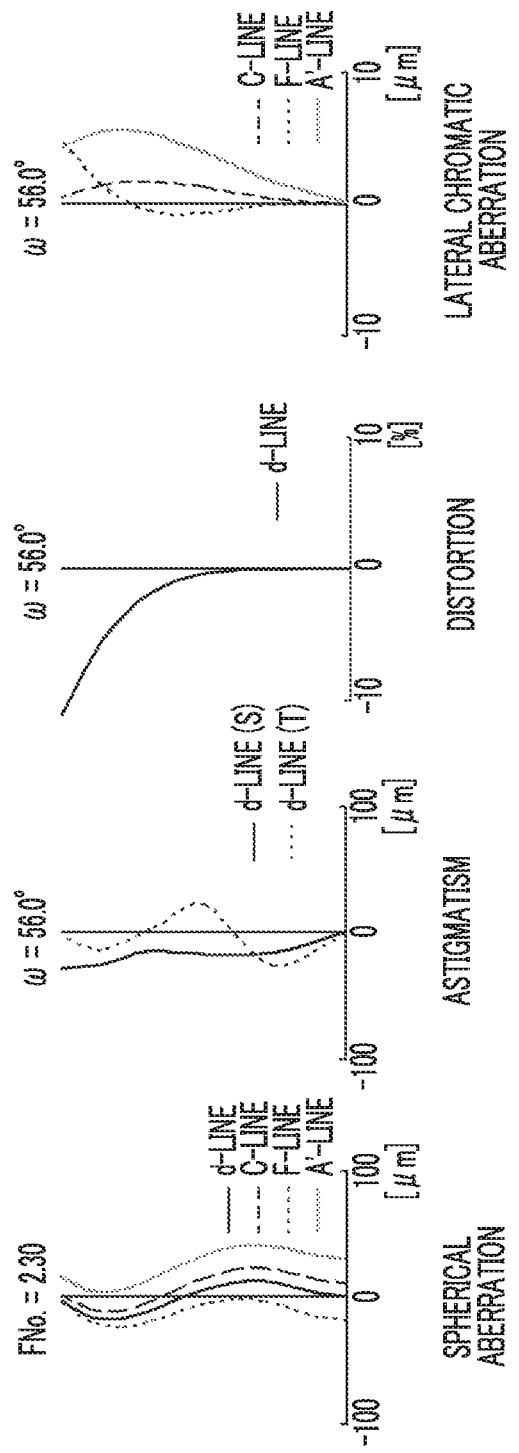
FIG. 7 is a diagram of aberrations of the imaging lens of Example 3 of the present invention.

Next, an imaging lens of Example 3 will be described. FIG. 4 is a cross-sectional view illustrating a lens configuration of the imaging lens of Example 3. Further, Table 7 shows basic lens data of the imaging lens of Example 3, Table 8 shows data about specification, and Table 9 shows data about aspheric coefficients. FIG. 7 shows aberration diagrams thereof.

TABLE 7

Example 3 Lens Data (n and ν are at d-line)

| Surface number | Radius of curvature | Surface distance | n | ν |
|---|---|---|---|---|
| 1 | 8.5931 | 1.7699 | 1.95375 | 32.32 |
| 2 | 3.9640 | 1.9285 | | |
| *3 | −1766.0062 | 1.6136 | 1.53112 | 55.30 |
| *4 | 3.2597 | 1.7107 | | |
| *5 | −99.9374 | 2.7738 | 1.63360 | 23.61 |
| *6 | −6.8438 | 1.9114 | | |
| 7 (Diaphragm) | ∞ | 0.6720 | | |
| *8 | −21.4755 | 1.3288 | 1.53112 | 55.30 |
| *9 | −8.3416 | 0.1852 | | |
| *10 | 9.1331 | 1.7134 | 1.53112 | 55.30 |
| *11 | −7.4905 | 0.1000 | | |
| *12 | −7.7354 | 0.5000 | 1.63360 | 23.61 |

TABLE 7-continued

Example 3 Lens Data (n and ν are at d-line)

| Surface number | Radius of curvature | Surface distance | n | ν |
|---|---|---|---|---|
| *13 | −54.5574 | 0.1000 | | |
| *14 | 4.8353 | 1.9098 | 1.53112 | 55.30 |
| *15 | −3.5447 | 0.1868 | | |
| 16 | −4.7073 | 0.8178 | 1.92286 | 20.88 |
| 17 | −32.3002 | 3.8560 | | |

TABLE 8

Example 3 Specification

| | |
|---|---|
| f | 2.42 |
| Bf | 3.86 |
| FNo. | 2.30 |
| 2ω[°] | 112.0 |

TABLE 9

Example 3 Aspheric Coefficients

| Surface number | 3 | 4 | 5 | 6 |
|---|---|---|---|---|
| KA | −2.4272007E+03 | 1.0019853E+00 | −3.2754653E+04 | 9.2748635E−01 |
| A3 | −5.8336975E−18 | 9.9721162E−18 | 1.4610349E−19 | 5.2506553E−20 |
| A4 | 1.5835214E−02 | 2.4278449E−02 | −2.4519573E−03 | 6.5642687E−04 |
| A5 | −1.9056727E−03 | −1.1098054E−02 | 2.8519980E−04 | −3.1242307E−04 |
| A6 | −1.1066208E−03 | 7.0017107E−03 | 2.1236228E−03 | −6.2267424E−04 |
| A7 | −1.3527189E−04 | 8.4527718E−04 | −1.5729788E−04 | 3.1916741E−04 |
| A8 | 2.4502646E−04 | −2.7919466E−03 | −1.1961833E−03 | 4.6627752E−04 |
| A9 | 2.0436720E−05 | −4.3137156E−04 | 7.2455931E−05 | −1.6433835E−04 |
| A10 | −3.8062045E−05 | 8.1041536E−04 | 4.3484932E−04 | −2.0528361E−04 |
| A11 | −1.7678926E−06 | 1.1188985E−04 | −1.9162763E−05 | 4.7184059E−05 |
| A12 | 4.2016195E−06 | −1.4384822E−04 | −1.0017762E−04 | 5.4525232E−05 |
| A13 | 1.2397331E−07 | −1.5523402E−05 | 2.9966586E−06 | −8.2417747E−06 |
| A14 | −3.2128313E−07 | 1.3827843E−05 | 1.4416971E−05 | −8.8816696E−06 |
| A15 | −5.2562251E−09 | 1.2977986E−06 | −2.7462410E−07 | 8.5318867E−07 |
| A16 | 1.5385562E−08 | −6.5272852E−07 | −1.2517085E−06 | 8.6442113E−07 |
| A17 | 1.2365737E−10 | −5.9789578E−08 | 1.3637322E−08 | −4.7922371E−08 |
| A18 | −4.1065164E−10 | 9.4551657E−09 | 5.9869287E−08 | −4.6028971E−08 |
| A19 | −1.2400559E−12 | 1.1647555E−09 | −2.8335363E−10 | 1.1238120E−09 |
| A20 | 4.6365626E−12 | 1.5797329E−10 | −1.2104631E−09 | 1.0302754E−09 |
| Surface number | 8 | 9 | 10 | 11 |
| KA | −1.7194109E+02 | 1.0187240E+01 | 1.1940612E+00 | 1.0784007E+00 |
| A3 | −5.6419759E−17 | 4.4098029E−18 | −3.7099743E−19 | −1.6237273E−18 |
| A4 | −1.0255699E−02 | −2.5800604E−03 | 1.6164635E−03 | −7.7752677E−03 |
| A5 | 4.4457563E−03 | 1.7103919E−05 | 2.7258868E−03 | −3.0304437E−03 |
| A6 | −1.7225159E−03 | 4.1947380E−05 | −5.2820870E−04 | 4.6463735E−03 |
| A7 | −1.7207943E−04 | −4.4185277E−06 | −1.3078566E−03 | 8.3345289E−04 |
| A8 | 1.1718519E−03 | 7.8318482E−05 | 3.1070764E−04 | −1.7732341E−03 |
| A9 | 1.3789211E−04 | 4.9130721E−05 | 4.8044030E−04 | −1.7955886E−04 |
| A10 | −2.5461051E−04 | 5.1317241E−06 | −1.7669367E−04 | 4.1556766E−04 |
| A11 | −1.4849950E−05 | −4.8911082E−06 | −1.2198615E−04 | 2.5950120E−05 |
| A12 | 3.0687216E−05 | −1.6664444E−06 | 6.0590139E−05 | −6.1141092E−05 |
| A13 | 1.2100789E−06 | 3.2339587E−07 | 2.0615298E−05 | −2.4177553E−06 |
| A14 | −2.2088810E−06 | 1.4469787E−07 | −1.1880921E−05 | 5.6667260E−06 |
| A15 | −5.7859785E−08 | −1.2549256E−08 | −2.2073662E−06 | 1.3888527E−07 |
| A16 | 9.3664621E−08 | −6.5246449E−09 | 1.3197610E−06 | −3.2104007E−07 |
| A17 | 1.4705285E−09 | 2.6665977E−10 | 1.3444427E−07 | −4.4655605E−09 |
| A18 | −2.1586966E−09 | 1.5261181E−10 | −7.7455298E−08 | 1.0150057E−08 |
| A19 | −1.5248265E−11 | −2.4039555E−12 | −3.5245358E−09 | 6.1412883E−11 |
| A20 | 2.0851773E−11 | −1.4675594E−12 | 1.8668441E−09 | −1.3717836E−10 |
| Surface number | 12 | 13 | 14 | 15 |
| KA | 1.0819334E+00 | −1.4388429E+01 | 6.4071029E−01 | 9.5451855E−01 |
| A3 | −2.6272970E−18 | −6.7452347E−19 | −1.2698595E−18 | −4.3112514E−18 |
| A4 | −4.5786779E−03 | 5.5418749E−03 | 1.3702254E−03 | 3.7138880E−03 |
| A5 | −3.9054987E−03 | 2.5498861E−03 | 4.2698423E−05 | 2.2800462E−03 |
| A6 | 2.8630440E−03 | −5.6918968E−03 | −2.6978065E−03 | 8.9697003E−04 |
| A7 | 1.6384535E−03 | −1.4836424E−03 | −2.5411679E−04 | −2.4255427E−04 |
| A8 | −1.2262515E−03 | 3.6151756E−03 | 1.6190018E−03 | −1.2822702E−03 |
| A9 | −5.3822501E−04 | 6.2427161E−04 | 5.9616821E−05 | 2.6079841E−04 |
| A10 | 3.3224133E−04 | −1.4390470E−03 | −5.8328768E−04 | 4.5347966E−04 |
| A11 | 1.1510844E−04 | −1.6812814E−04 | −8.8356299E−06 | −7.9668956E−05 |
| A12 | −5.7993502E−05 | 3.6703144E−04 | 1.3750941E−04 | −1.0053371E−04 |
| A13 | −1.5624843E−05 | 2.8656996E−05 | 8.9422579E−07 | 1.3123930E−05 |
| A14 | 6.5248447E−06 | −5.9728879E−05 | −2.1034844E−05 | 1.4966383E−05 |
| A15 | 1.2974911E−06 | −2.9884411E−06 | −4.9186819E−08 | −1.3065138E−06 |
| A16 | −4.5793711E−07 | 5.9823753E−06 | 1.9934328E−06 | −1.4130693E−06 |
| A17 | −6.0061240E−08 | 1.7383498E−07 | 1.0875987E−09 | 7.1960356E−08 |

TABLE 9-continued

Example 3 Aspheric Coefficients

| A18 | 1.8262438E−08 | −3.3548205E−07 | −1.0580840E−07 | 7.6226751E−08 |
| A19 | 1.1865098E−09 | −4.3184694E−09 | 3.0666808E−12 | −1.6819048E−09 |
| A20 | −3.1637809E−10 | 8.0525768E−09 | 2.3969364E−09 | −1.7784164E−09 |

Table 10 shows values corresponding to the conditional expressions (1) to (4) of the imaging lenses of Examples 1 to 3. It should be noted that, in the above-mentioned examples, the d-line is set as the reference wavelength, and the values shown in the following Table 10 are values at the reference wavelength.

TABLE 10

| Expression number | Conditional expression | Example 1 | Example 2 | Example 3 |
|---|---|---|---|---|
| (1) | f/fF | −0.16 | −0.20 | −0.25 |
| (2) | f/fR | 0.47 | 0.48 | 0.46 |
| (3) | D34/f | 0.87 | 0.94 | 1.07 |
| (4) | 2ω | 112.0 | 112.0 | 112.0 |

As can be seen from the above-mentioned data, all the imaging lenses of Examples 1 to 3 satisfy the conditional expressions (1) to (4), and are imaging lenses each of which is a wide-angle imaging lens, has a small F number, and is capable of satisfactorily correcting various aberrations.

Figure 8:
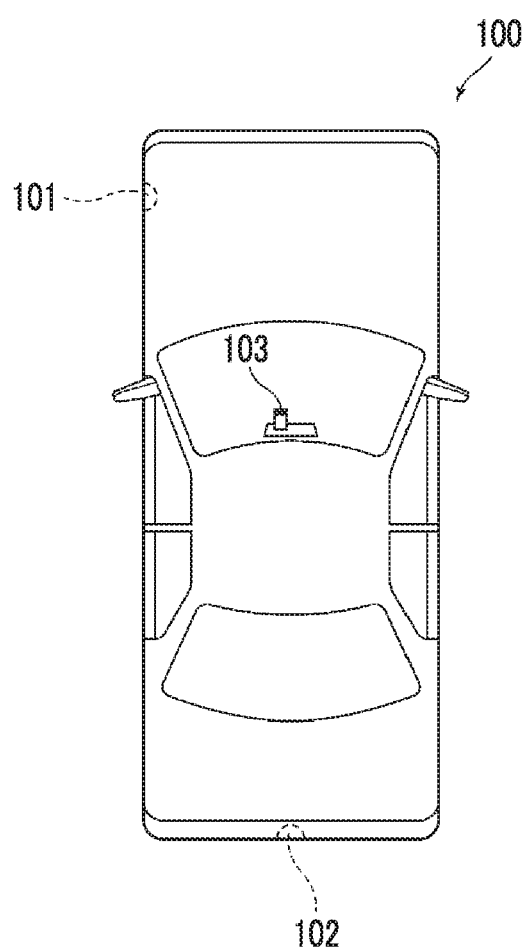
FIG. 8 is a schematic configuration diagram of an imaging apparatus according to an embodiment of the present invention.

Next, an imaging apparatus according to an embodiment of the present invention will be described. Here, as an embodiment of the imaging apparatus of the present invention, an example in a case of applying the invention to an on-board camera will be described. FIG. 8 shows a situation where the on-board camera is mounted on a vehicle.

In FIG. 8, a vehicle 100 comprises: an outside-vehicle camera 101 that is for capturing an image of a blind area on a lateral side of a passenger seat; an outside-vehicle camera 102 that is for capturing an image of a blind area on a rear side of the vehicle 100; and an in-vehicle camera 103 which is mounted on the rear of the rearview mirror in order to capture an image in a range of field of view which is the same as that of a driver. The outside-vehicle camera 101, the outside-vehicle camera 102, and the in-vehicle camera 103 are imaging apparatuses, and each apparatus comprises the imaging lens according to the embodiment of the present invention; and an imaging element that converts an optical image, which is formed through an imaging lens, into an electrical signal. The on-board cameras (the outside-vehicle cameras 101 and 102 and the in-vehicle camera 103) of the present embodiment each comprise the imaging lens of the present invention. Thus, it is possible to capture a high quality image with a wide angle of view.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens component are not limited to the values shown in the numerical examples, and different values may be used therefor.

The imaging apparatuses according to the embodiment of the present invention are also not limited to the on-board cameras, but may include various embodiments such as a mobile terminal camera, a surveillance camera, and a digital camera.

EXPLANATION OF REFERENCES

100: vehicle
101, 102: outside-vehicle camera
103: in-vehicle camera
GF: front group
GR: rear group
L1 to L8: lens
Sim: image plane
St: aperture diaphragm
wa: on-axis rays
wb: rays with maximum angle of view
Z: optical axis

What is claimed is:

1. An imaging lens consisting of, in order from an object side:
a front group;
a diaphragm; and
a rear group,
wherein the front group consists of, in order from the object side, a first lens that is convex toward the object side and has a negative refractive power, a second lens that has a negative refractive power, and a third lens that has a positive refractive power, and
wherein the rear group consists of, in order from the object side, a fourth lens that has a positive refractive power, a fifth lens that has a positive refractive power, a sixth lens that has a negative refractive power, a seventh lens that has a positive refractive power, and an eighth lens that has a negative refractive power.

2. The imaging lens according to claim 1,
wherein the following conditional expression (1) is satisfied, $$-0.4 < f/fF < -0.1 \qquad (1),$$

where f is a focal length of a whole system, and
fF is a focal length of the front group.

3. The imaging lens according to claim 2,
wherein the following conditional expression (2) is satisfied, $$0.36 < f/fR < 0.57 \qquad (2),$$

where f is the focal length of the whole system
fR is a focal length of the rear group.

4. The imaging lens according to claim 3,
wherein the following conditional expression (3) is satisfied, $$0.65 < D34/f < 1.5 \qquad (3),$$

where D34 is an air gap on an optical axis between the third lens and the fourth lens, and
f is the focal length of the whole system.

5. The imaging lens according to claim 3,
wherein the following conditional expression (4) is satisfied, $$100 < 2\omega \qquad (4),$$

where 2ω is a total angle of view in a unit of degree (°).

6. The imaging lens according to claim 2,
wherein the following conditional expression (3) is satisfied, $$0.65 < D34/f < 1.5 \quad (3),$$

where D34 is an air gap on an optical axis between the third lens and the fourth lens, and
f is the focal length of the whole system.

7. The imaging lens according to claim 6,
wherein the following conditional expression (4) is satisfied, $$100 < 2\omega \quad (4),$$

where $2\omega$ is a total angle of view in a unit of degree (°).

8. The imaging lens according to claim 2,
wherein the following conditional expression (4) is satisfied, $$100 < 2\omega \quad (4),$$

where $2\omega$ is a total angle of view in a unit of degree (°).

9. The imaging lens according to claim 2,
wherein the following conditional expression (1-1) is satisfied, $$-0.27 < f/F < -0.14 \quad (1\text{-}1).$$

10. The imaging lens according to claim 1,
wherein the following conditional expression (2) is satisfied, $$0.36 < f/fR < 0.57 \quad (2),$$

where f is the focal length of the whole system
fR is a focal length of the rear group.

11. The imaging lens according to claim 10,
wherein the following conditional expression (3) is satisfied, $$0.65 < D34/f < 1.5 \quad (3),$$

where D34 is an air gap on an optical axis between the third lens and the fourth lens, and
f is the focal length of the whole system.

12. The imaging lens according to claim 11,
wherein the following conditional expression (4) is satisfied, $$100 < 2\omega \quad (4),$$

where $2\omega$ is a total angle of view in a unit of degree (°).

13. The imaging lens according to claim 10,
wherein the following conditional expression (4) is satisfied, $$100 < 2\omega \quad (4),$$

where $2\omega$ is a total angle of view in a unit of degree (°).

14. The imaging lens according to claim 10,
wherein the following conditional expression (2-1) is satisfied, $$0.41 < f/fR < 0.52 \quad (2\text{-}1).$$

15. The imaging lens according to claim 1,
wherein the following conditional expression (3) is satisfied, $$0.65 < D34/f < 1.5 \quad (3),$$

where D34 is an air gap on an optical axis between the third lens and the fourth lens, and
f is the focal h of the whole system.

16. The imaging lens according to claim 15,
wherein the following conditional expression (4) is satisfied, $$100 < 2\omega \quad (4),$$

where $2\omega$ is a total angle of view in a unit of degree (°).

17. The imaging lens according to claim 15,
wherein the following conditional expression (3-1) is satisfied, $$0.79 < D34/f < 1.17 \quad (3\text{-}1).$$

18. The imaging lens according to claim 1,
wherein the following conditional expression (4) is satisfied, $$100 < 2\omega \quad (4),$$

where $2\omega$ is a total angle of view in a unit of degree (°).

19. The imaging lens according to claim 9,
wherein the following conditional expression (4-1) is satisfied, $$110 < 2\omega \quad (4\text{-}1).$$

20. An imaging apparatus comprising the imaging lens according to claim 1.

* * * * *